United States Patent Office 2,972,617

Patented Feb. 21, 1961

2,972,617

N-DI-(ALKANOL-PIPECOLYL)-ALKANOL AMINES

Francis E. Cislak, Indianapolis, Ind., assignor to Reilly Tar & Chemical Corporation, Indianapolis, Ind., a corporation of Indiana No Drawing. Filed June 10, 1959, Ser. No. 819,220

6 Claims. (Cl. 260—294.7)

This invention relates to new compositions of matter and to the process of making them. More specifically, it relates to N-di-(alkanol-pipecolyl)-alkanol amines, which compounds have the following general formula:

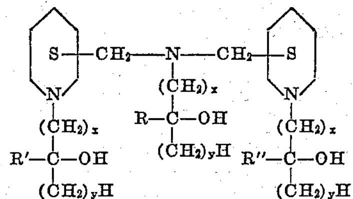

wherein $x$ is 1, 2, 3, or 4; $y$ is 0, 1, or 2; R, R', and R'' are hydrogen or lower alkyl.

In general, my new compounds may be prepared by the reaction of a chlorohydrin with a di-pipecolylamine. Some of them may be prepared by the reaction of an alkylene oxide with a di-pipecolylamine. My invention will be described more fully in conjunction with the specific examples given herein. The parts are by weight.

EXAMPLE 1

*N-di-(1-gamma-hydroxypropyl-4-pipecolyl)-propanol amine*

CH₂———N———CH₂

Into a vessel equipped with a stirrer and a reflux condenser is placed 220 parts of di-4-pipecolyl amine, 400 parts of trimethylene chlorohydrin, and 400 parts of anhydrous potassium carbonate. The mixture is heated under reflux conditions (about 160° C.) for six to eight hours. The N-di-(1-gamma-hydroxypropyl-4-pipecolyl)-propanol amine formed during the reaction period is isolated in any convenient manner. One way in which the propanol amine may be isolated is as follows: The reaction mixture is cooled to about 15° C. to 25° C. About 300–500 parts of water are added to the reaction mixture. After stirring to form a uniform mixture, the solution is extracted with ether. The N-di-(1-gamma-hydroxypropyl-4-pipecolyl)-propanol amine is recovered from the ether solution by fractional distillation under vacuum.

EXAMPLE 2

*N-di-(1-beta-hydroxyethyl-3-pipecolyl)-ethanol amine*

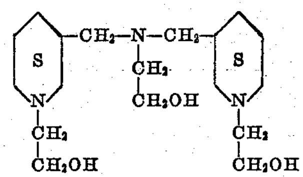

Into a vessel equipped with a stirrer and a reflux condenser is placed 220 parts of di-3-pipecolylamine. The pipecolylamine is cooled to about −5° C. The reflux condenser is cooled to about 0° C. and is maintained at this temperature during the reaction period. 300 parts of ethylene oxide is added and the reaction mixture is gradually warmed and maintained at reflux conditions for about six hours. At the end of the reflux period, the excess ethylene oxide is distilled off. The residue is the desired N-di-(1-beta-hydroxyethyl-3-pipecolyl)-ethanol amine.

EXAMPLE 3

*N-di-(1-beta-hydroxypropyl-2-pipecolyl)-propan-2-ol amine*

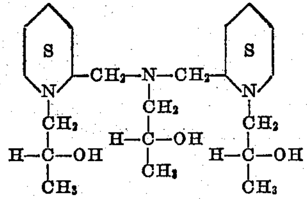

A solution of 220 parts of di-2-pipecolylamine and 300 parts of methanol is placed in a reaction vessel equipped with a reflux condenser and a mechanical stirrer. The solution is cooled to about −5° C. and while stirring it there is added slowly in small portions, 250 parts of propylene oxide. After all the propylene oxide has been added, the reaction mixture is gradually warmed and maintained at about 35° C. for about six hours. The N-di-(1-beta-hydroxypropyl-2-pipecolyl)-propan-2-ol amine formed during the reaction is isolated by fractional distillation under high vacuum.

EXAMPLE 4

*N-di-(1-5'hydroxypentyl-3-pipecolyl)-pentan-1-ol amine*

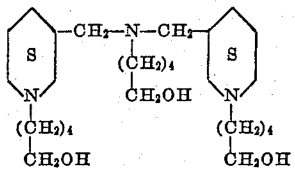

The procedure of Example 1 is repeated except that di-3-pipecolylamine is used in place of the di-4-pipecolylamine and pentamethylene chlorohydrin is used in place of the trimethylene chlorohydrin.

EXAMPLE 5

*N,N-(1-beta-hydroxyethyl-4-pipecolyl), (1-beta-hydroxyethyl-3-pipecolyl)-ethanol amine*

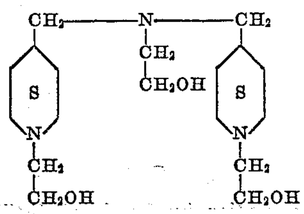

The procedure of Example 2 is repeated except that 4-pipecolyl, 3 pipecolylamine is used in place of the di-3-pipecolylamine.

EXAMPLE 6

*N-di-(beta-hydroxyethyl-4-pipecolyl)-ethanol amine*

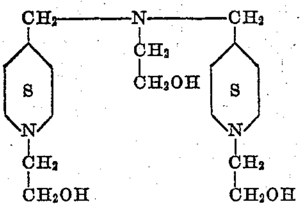

The procedure of Example 3 is repeated except that di-4-pipecolylamine is used in place of the di-3-pipecolylamine and ethylene oxide is used in place of the propylene oxide.

My N-di-(alkanolpipecolyl)-alkanol amines are useful as curing agents for epoxy resins. Because of their extremely low volatility, no induction period is needed after mixing them with the epoxy resin and the toxicity hazards are minimized. Since my N-di-(alkanolpipecolyl)-alkanolamines are tri-amines as well as trihydroxy alcohols they can be blended with epoxy resins to "cure" to thermo-set or cross-linked resins.

The alkanol amines of my invention are useful raw materials for the manufacture of polyester resins. The presence of three hydroxyl groups makes them particularly useful for the preparation of cross-linked resins. The presence of a piperidino nitrogen in the resin matrix imparts to resins made from my alkanol amines an unusual affinity for the glass fibers commonly used for the reinforcement of polyesters.

Esters made from my alkanol amines are useful as stabilizers for polyvinylchloride and for polyvinylidine chloride resins.

I claim as my invention:

1. N-di-(alkanol-pipecolyl)-alkanol amines having the following general formula:

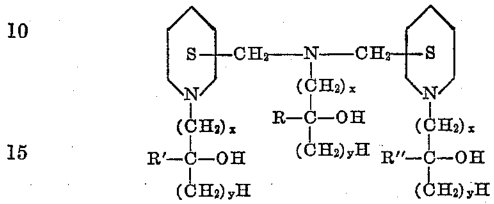

wherein $x$ is an integer selected from the group consisting of 1, 2, 3, and 4; $y$ is an integer selected from the group consisting of 0, 1, and 2; and R, R′, and R″ are selected from the group consisting of hydrogen and lower alkyl.

2. The compound N-di-(1-gamma-hydroxy-propyl-4-pipecolyl)-propanol amine.

3. The compound N-di-(1-beta-hydroxy-propyl-2-pipecolyl)-propan-2-ol amine.

4. The compound N-di-(1-beta-hydroxyethyl-3-pipecolyl)-ethanol amine.

5. The compound N,N-(1-beta-hydroxyethyl-4-pipecolyl), (1-beta-hydroxy-3-pipecolyl)-ethanol amine.

6. The compound N-di-(1-beta-hydroxyethyl-4-pipecolyl)-ethanol amine.

References Cited in the file of this patent

UNITED STATES PATENTS

| | | |
|---|---|---|
| 1,845,403 | Eisleb | Feb. 16, 1932 |
| 2,520,093 | Gross | Aug. 22, 1950 |
| 2,684,965 | Weston et al. | July 27, 1954 |

FOREIGN PATENTS

| | | |
|---|---|---|
| 166,545 | Australia | Jan. 16, 1956 |

OTHER REFERENCES

Krasuski et al.: British Chem. Abstracts (1929), page 1078.